United States Patent [19]

Bullinga

[11] 4,293,850

[45] Oct. 6, 1981

[54] TEMPERATURE COMPENSATED ROTARY POSITIONER

[75] Inventor: Lothar H. Bullinga, Marion, Iowa

[73] Assignee: Rockwell International Corporation, El Segundo, Calif.

[21] Appl. No.: 124,195

[22] Filed: Feb. 25, 1980

[51] Int. Cl.³ .............................................. G08B 5/00
[52] U.S. Cl. ............................... 340/378.5; 340/378.2
[58] Field of Search ......................... 340/378.2, 378.5; 310/68 R, 68 A, 49 R; 318/696

[56] References Cited

U.S. PATENT DOCUMENTS

| | | | |
|---|---|---|---|
| 3,350,709 | 10/1967 | Pursiano | 340/378.2 |
| 3,736,588 | 5/1973 | Harden | 340/378.2 |
| 4,100,473 | 7/1978 | Lawrenson | 318/696 |

*Primary Examiner*—Harold I. Pitts
*Attorney, Agent, or Firm*—Terry M. Blackwood; Richard A. Bachand; H. Fredrick Hamann

[57] ABSTRACT

A rotary positioning system includes a prime movement device having a plurality of windings spatially distributed to cause a rotor to assume, upon commanded energization of the windings, different ones of discrete angular positions. The system also includes a temperature variable power supply which compensates for the rotor's temperature-dependent variation in damping.

5 Claims, 3 Drawing Figures

TEMPERATURE COMPENSATED ROTARY POSITIONER

BACKGROUND OF THE INVENTION

This invention relates to rotary positioning devices of the type wherein a shaft can be commanded to rotate to any one of a predetermined number of fixed angular positions. In the preferred application, the invention relates to electromagnetic wheel indicators of the type having symbols marked upon the drum of a rotor that can turn to bring any of the symbols to a display station.

In typical electromagnetic wheel indicators, the angular orientation of a permanent magnet rotor is governed by an electromagnetic stator which is capable of establishing, upon receiving appropriate command signals, any one of a plurality of differently oriented magnetic fields. As the stator field is changed to a new orientation, the rotor appropriately realigns itself therewith and thus the rotor is capable of assuming any one of a plurality of discrete angular positions. Typically, attached to the rotor is a symbol-bearing wheel and at each particular rotor angle position a particular symbol registers in a display station. Such devices are well known and understood in the art. See for instance U.S. Pat. Nos. 3,411,155, 3,636,557, and 3,636,550.

A common problem with such devices is that of performance variation with temperature changes. More specifically, such devices frequently provide sluggish or overdamped response at cold temperatures while providing underdamped response at room or higher temperatures. Previous attempts to solve such problem have included adjustments in lubricant viscosity and/or adjustments and magnetic strength.

BRIEF DESCRIPTION OF THE DRAWING

In accordance with the present invention, such problem is addressed and resolved by using a temperature variable power supply to drive a temperature sensitive electromagnetic positioner. These and other features, objects, and advantages of the invention will become more apparent upon reference to the following specification, claims, and appended drawings in which:

DESCRIPTION OF THE PREFERRED EMBODIMENT(S)

Figure 1:
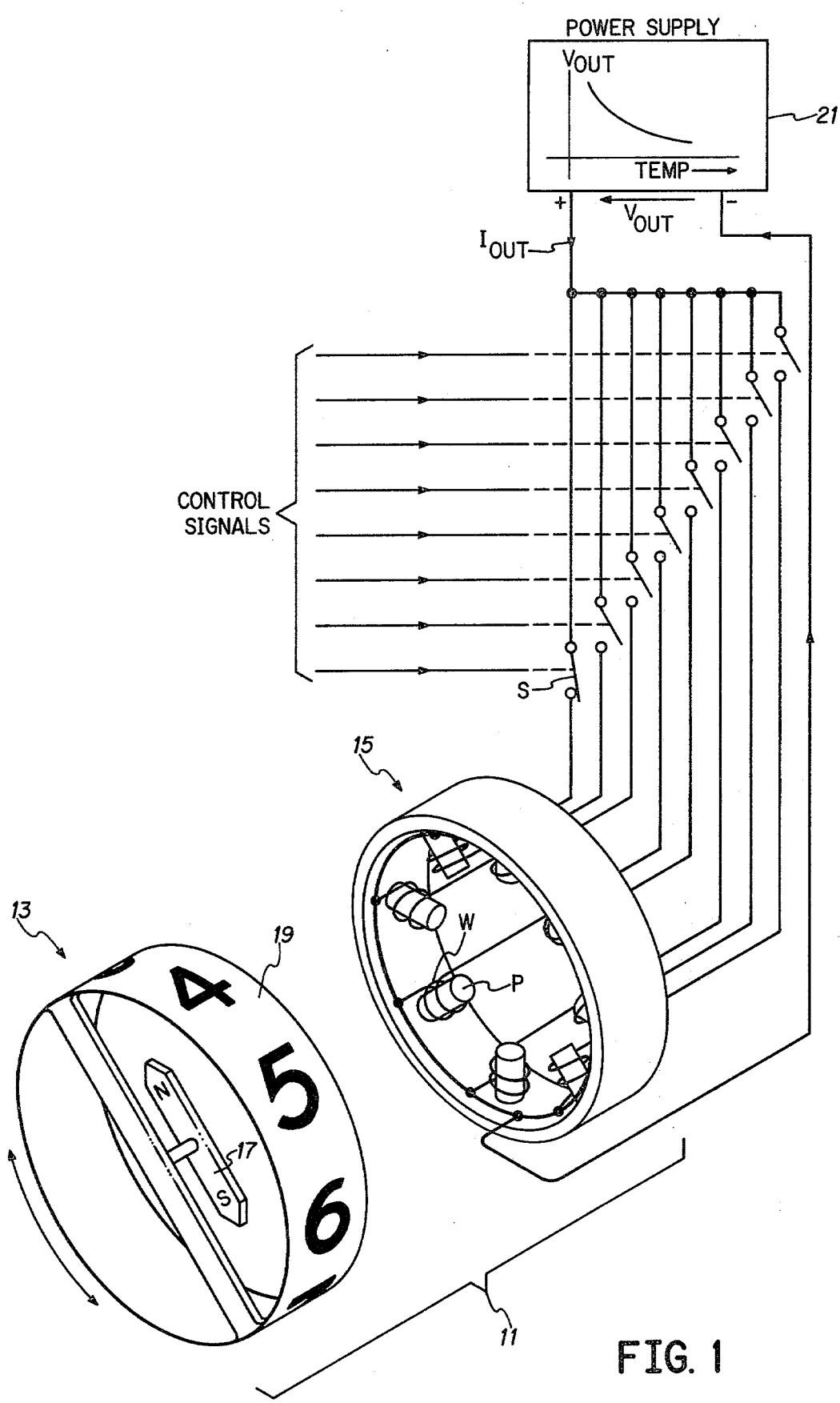
FIG. 1 is a schematic representing the presently preferred application of the inventive principles herein.

Turning now to FIG. 1, an electromagnetic wheel indicator 11 comprises a rotor portion 13 and a stator portion 15. Rotor 13 comprises a permanent magnet 17 and a symbol-bearing wheel or drum 19. Stator 15 comprises a plurality of windings W each encircling a different salient pole P of ferromagnetic material. For simplification in illustration, FIG. 1 shows eight such stator windings and poles. Conventional magnetic wheel embodiments typically employ ten or more windings.

The windings and poles are spaced at regular angular intervals and each winding corresponds in position to a particular indicium on the display wheel. By suitable control signals closing one of the switches S (and opening the rest) a selected or commanded one of the windings has impressed thereacross the output voltage of power supply 21 and such activated winding causes the permanent magnet 17 and wheel 19 to rotate until the appropriate pole of permanent magnet 17 is aligned with said activated winding. A housing (not illustrated) for item 11 contains an aperature through which the desired indicium corresponding to the commanded winding is viewable.

In accordance with the present invention, the power supply 21 output voltage $V_{out}$ (and also output current $I_{out}$) varies with temperature in a manner which lessens indicator damping variations with temperature. More particularly, to reduce the above-mentioned magnetic wheel problem of sluggish or overdamped performance at low temperature, and underdamped performance at high temperature, a temperature-variable power supply is used to drive the magnetic wheel indicator, such variable supply providing relatively high voltage and current at cold temperatures and relatively low voltage and current at warmer temperatures. In the preferred embodiment, the voltage and current decrease continuously with increasing temperature. As a result, the magnetic wheel indicator performs acceptably well over the entire operating temperature range. At cold temperatures the increased drive reduces the overdamping, and at warm temperatures the decreased drive reduces the underdamping.

Figure 2:
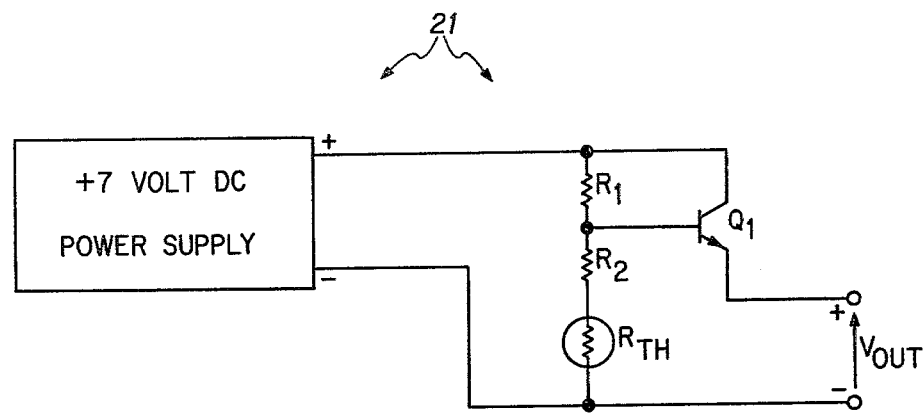
FIG. 2 is a more detailed schematic of a present embodiment of the FIG. 1 item 21; and, FIG. 3 shows curves and data useful in explaining the operation of the apparatus of FIGS. 1 and 2.
Figure 3:
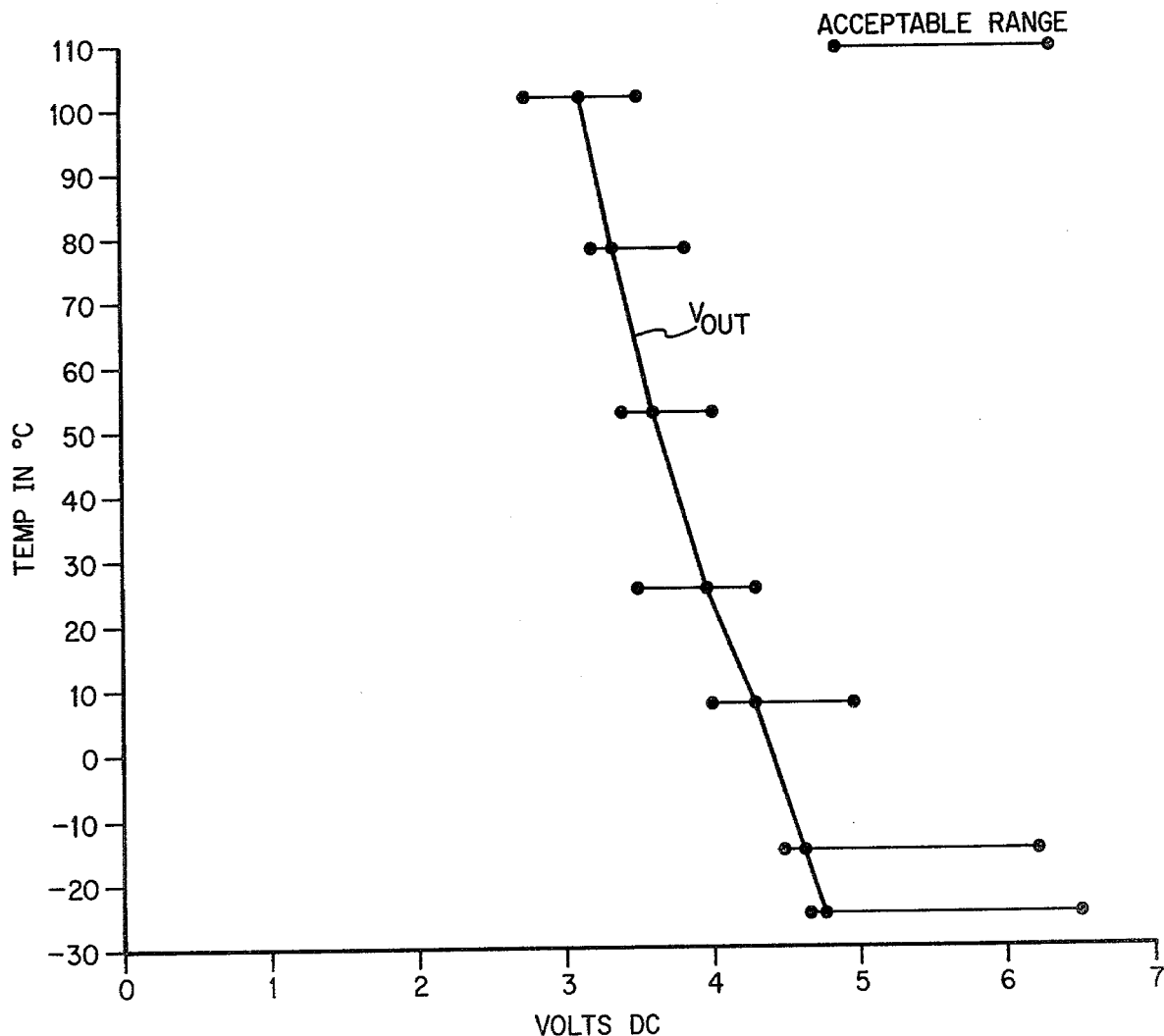

In a specific present embodiment, the supply shown in FIG. 2 is used to drive a magnetic wheel indicator type No. DS11012 available from Montevideo Technology. The specific output voltage versus temperature characteristic for the FIG. 2 apparatus is shown in FIG. 3 and was caused, by design, to fall within ranges of acceptable-performance-producing voltages throughout the desired temperature range. More particularly, the above identified indicator was subjected to tests over a temperature range of $-25°$ C. to $105°$ C. At each of several different temperatures the drive voltage was varied to determine an acceptable performance range of voltges at the particular test temperature. For instance at $-25°$ C. about 4.7 volts and about 6.5 volts produced subjectively acceptable limits of, respectively, overdamping and underdamping. Any voltage between these limits was therefore considered acceptable. Similarly, the other straight lines on bars in FIG. 3 each represent a different voltage range producing, at a particular temperature, a subjectively acceptable performance range. Note that $V_{out}$ at each temperature falls in the acceptable voltage range for that temperature.

For driving the above identified wheel indicator, the specific components used in the FIG. 2 apparatus are as follows. $R_1$ and $R_2$ are, respectively, 18 ohm and 8.2 ohm resistors. $R_{TH}$ is a thermistor, type No. 0550F5-255 available from Carborundum Co., and which would vary from about 304 ohms at $-25°$ C. to about 16.9 ohms at $+105°$ C. if no power was dissipated in the thermistor. In the application of FIG. 2, the power dissipated in the thermistor heats it up and decreases its resistance such that it varies from about 73 ohms at $-25°$ C. to about 14.7 ohms at $+105°$ C. Transistor $Q_1$ is a 2N3767.

It should be apparent that an appropriate temperature-variable $V_{out}$ could be effected in a variety of ways. For instance, supply 21 could comprise (i) an appropriate plurality of constant voltage supplies each having a different fixed output voltage selected for corresponding to a particular portion of the overall temperature range, and (ii) an appropriate temperature sensing switch which at a particular temperature connects the appropriate fixed supply to the output terminal of supply 21. Under such conditions the $V_{out}$ versus temperature characteristic would comprise a piecewise linear, but nonetheless satisfactory, curve. Another implementation could comprise an appropriate thermistor merely in series with the supply 21 drive current. Thus, while particular embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a rotary positioning system of the type comprising (i) prime movement means comprising a rotor, stator, and a plurality of windings disposed at different angular positions around one of said stator and rotor, and (ii) selecting means for selectively connecting at least one winding to an energizing source thereby causing the rotor to rotate to a predetermined position, an improved energizing source comprising means for supplying a temperature-variable voltage or current which automatically varies in a predetermined manner with temperature so as to lessen inherent temperature-caused variation in damping of the prime movement means rotor.

2. The rotary positioning system as defined in claim 1 wherein said improved energizing source comprises means for supplying a voltage or current which is greater at a predetermined temperature $T_1$ than at a predetermined temperature $T_2$, where $T_2$ is greater than $T_1$.

3. An electromagnetic wheel display system comprising:
   a rotor having a magnet and symbol-bearing means, the symbols being distributed at different angles around the rotor,
   a stator having a plurality of windings disposed at different angles around the stator, each winding corresponding to a particular symbol,
   a power supply means for providing a temperature-variable voltage or current which automatically varies in a predetermined manner with variation in temperature, and
   selecting means for selectively connecting at least one of said windings to said power supply means thereby causing the rotor magnet and rotor symbols to rotate to a position dictated by the energized winding or windings.

4. An electromagnetic wheel display system as defined in claim 3 wherein said power supply means provides a voltage or current which is greater at a predetermined temperature $T_1$ than at a predetermined temperature $T_2$, where $T_2$ is greater than $T_1$.

5. An electromagnetic wheel display system as defined in claim 3 wherein said power supply means provides a voltage or current which decreases with increasing temperature so as to reduce inherent temperature-caused variation in damping of the rotor.

* * * * *